Sept. 6, 1966 W. B. GORMAN ETAL 3,270,406
PIPE FITTING TOOL
Filed March 1, 1965
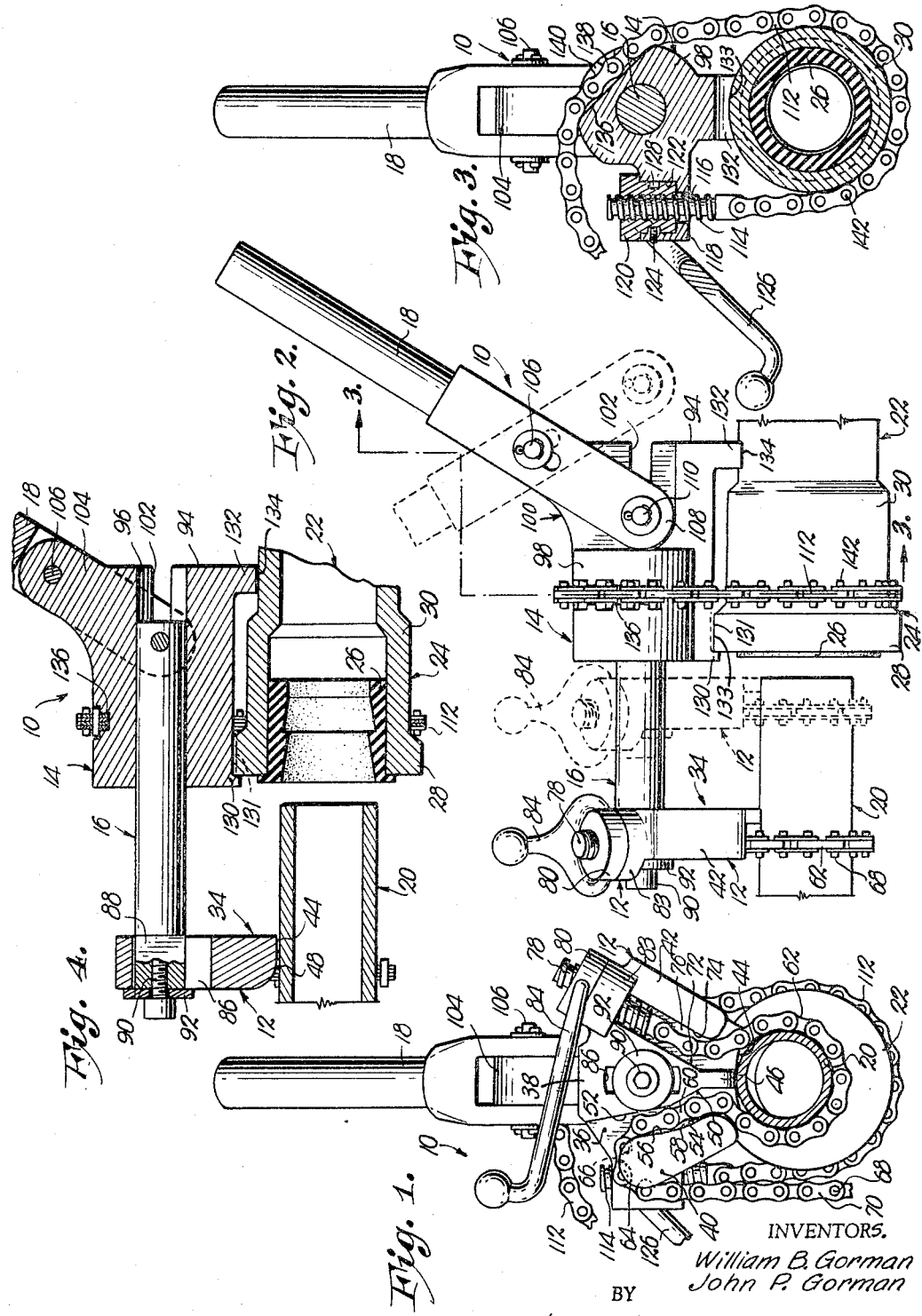
INVENTORS.
William B. Gorman
John P. Gorman
BY
Hovey, Schmidt, Johnson & Hovey
ATTORNEYS United States Patent Office 3,270,406
Patented Sept. 6, 1966

1

3,270,406
PIPE FITTING TOOL
William B. Gorman, 6607 N. Wayne, Kansas City, Mo.,
and John P. Gorman, 2527 Lee St., Simi, Calif.
Filed Mar. 1, 1965, Ser. No. 436,234
11 Claims. (Cl. 29—237)

This application is a continuation-in-part of our co-pending application Serial No. 272,764, filed April 12, 1963, and entitled, "Pipe Fitting Tool," now abandoned.

This invention relates to improvements in pipe fitting tools and, more particularly, to a pipe fitting tool which is self-aligning to compensate for small variations in the outer diameters of pipes to be fitted together.

The present invention provides a tool for fitting two sections of pipe together, such pipe being of the type used for heavy plumbing assemblies and the like. Generally, it is desired that this type of pipe be made to conform to certain specifications, but in practice, this is not always accomplished because of small dimensional variations in the pipe due to the manufacturing technique which is utilized. For instance, cast pipe usually has an outer surface which is roughened so as to present small projections and depressions which give rise to variations in the diameter of the pipe at any given location along its length. Conventional pipe fitting tools have a pair of pipe-gripping assemblies which move toward and away from each other so that a pair of pipe sections gripped by the assemblies may be moved together and thereby joined. However, neither of these assemblies can move toward and away from the pipe section gripped thereby so as to adjust itself to changes in the outer diameter of the section due to the aforesaid projections. Hence, a pipe section gripped by one assembly often-times may not be truly aligned with the pipe section gripped by the other assembly and the tool becomes ineffective for fitting one section into the other section. As a result, other means, such as hammers or the like, are required to complete the fit between the two sections.

It is, therefore, the primary object of the present invention to provide a pipe fitting tool of the type having a pair of pipe-gripping assemblies mounted on a reciprocable shaft wherein one of the assemblies is movable transversely of the shaft, whereby the tool may join a pair of pipe sections together regardless of projections and recesses in the outer surfaces of the sections which change the diameters thereof.

Another object of this invention is the provision of a pipe fitting tool of the aforesaid character wherein one of the gripping assemblies has a slotted head which receives the shaft in a manner such that the head is shiftable laterally of the shaft toward and away from the corresponding pipe section and thereby is self-alignable to compensate for changes in the outer diameters of different pipe sections.

Yet another object of this invention is the provision of a pipe-fitting tool of the type described wherein the head of one of the assemblies has a pair of relatively convergent grooves for receiving a flexible gripping member, the grooves being in close proximity to each other as the extremities thereof adjacent the corresponding pipe section are approached, whereby the gripping member is able to engage a greater portion of the pipe section than has heretofore been possible with conventional pipe fitting tools to thereby render the present tool more efficient for gripping pipe sections than such conventional tools.

In the drawing:

FIGURE 1 is an end elevational view of the pipe fitting tool illustrating a pipe-gripping assembly having a slotted head movable transversely of one of the pipe sections to be joined;

2

FIG. 2 is a side elevational view of the tool, shown mounted in an operative position on a pair of pipe sections and illustrating two operative positions thereof;

FIG. 3 is a cross-sectional view taken along line 3—3 of FIG. 2; and

FIG. 4 is a cross-sectional view of the tool illustrating the way in which the slotted head is mounted on a reciprocable shaft carried by the other gripping assembly.

Pipe fitting tool 10 includes a pair of pipe-gripping assemblies 12 and 14, a shaft 16 interconnecting assemblies 12 and 14, and a handle 18 for reciprocating shaft 16 with respect to assembly 14. Tool 10 is adapted for interconnecting a pair of pipe sections 20 and 22 so that section 22 telescopically receives section 20 in the bell portion 24.

As illustrated in FIG. 4, a resilient, annular seal 26 is disposed within portion 24 and is adapted to receive the corresponding end of section 20 therewithin. The use of seal 26 obviates any other type of closing means, such as molten lead or the like. Portion 24 is provided with an outer annular flange 28 adjacent to the end face 29 thereof and an intermediate flange 30 connecting flange 28 with the remaining part of section 22.

Assembly 12 includes a head 34 comprised of a plate-like body 36 having a central boss 38 and a pair of side like bosses 40 and 42 spaced from boss 38. Body 36 has an arcuate, generally lowermost end face 44 for engaging section 20 as illustrated in FIGS. 1 and 2. The generally lowermost extremity of boss 38 is spaced from face 44, and a rib 46 spans the distance between face 44 and boss 38, the lowermost face 48 of rib 46 being coextensive with face 44 as illustrated in FIG. 4.

Boss 38 is provided at one side thereof with a pair of angularly disposed surfaces 50 and 52 which are substantially parallel with corresponding surfaces 54 and 56 on boss 40 as illustrated in FIG. 1. Surfaces 50, 52, 54 and 56, together with the proximal surface of body 36, defines a first groove 58 for receiving one stretch 60 of a flexible gripping member 62 in the nature of a link chain. The upper extremity 64 of boss 40 is spaced from the proximal surface of body 36 to define a passageway extending laterally from groove 58. Body 36 and extremity 64 are provided with a series of spaced projections 66 which define recesses therein for receiving the outer ends of pins 68 which interconnect the links 70 of member 62 together. Thus, when stretch 60 extends through groove 58 and the passageway defined by body 36 and extremity 64, member 62 is releasably interconnected adjacent one end thereof to preclude movement of stretch 60 relative to groove 58 in a direction outwardly of face 44.

Boss 38 is provided on the opposite side thereof with a surface 72 which is generally parallel with a corresponding surface 74 of boss 42. Surfaces 72 and 74 define a groove 76 which converges with groove 58 at a location adjacent to rib 46. A screw 78 having a collar 80 threaded thereon extends into groove 76 a short distance. Member 62 is secured in any suitable manner to screw 78 so that, as collar 80 is rotated on the latter, member 62 moves through groove 76 in a predetermined direction dependent upon the direction of rotation of collar 80. Collar 80 is disposed within an enlarged bore 82 coextensive with groove 76. An arcuate band 83 interconnects bosses 31 and 42 to thereby prevent movement of collar 80 laterally of head 34. A handle 84 is provided to rotate collar 80 and thereby cause reciprocation of screw 78 relative to groove 76.

Head 34 is provided with an elongated slot 86 which extends through body 36 and boss 38 and is substantially perpendicular to section 20 as illustrated in FIG. 1. Shaft 16 is provided with a pair of opposed flat surfaces 88 and is received within slot 86 with surfaces 88 being adjacent to the sides of slot 86. A bolt 90, having a washer 92 thereon, is threadably mounted on shaft 16 in the manner shown in FIG. 4 to releasably retain head 34 on shaft 16. The thickness of head 34 is slightly less than the longitudinal length of surfaces 88 so that head 34 will be freely shiftable between the limits defined by slot 86 when bolt 90 and washer 92 are coupled to shaft 16 in the manner shown in FIG. 4.

Assembly 14 includes a body 94 having a central bore 96 therethrough for telescopically receiving shaft 16. One portion 98 of body 94 is cylindrical and is integral with a second portion 100 having a pair of spaced slots 102 on diametrically opposed sides of bore 96. An extension 104 is integral with portion 100 and projects laterally therefrom at an angle as illustrated in FIG. 4.

Handle 18 is pivotally mounted by means of a pin 106 on the outer end of extension 104, pin 106 being spaced from the end 108 of handle 18. A pin 110 pivotally mounts end 108 on the proximal end of shaft 16 so that pivotal movement of handle 18 in opposed directions relative to assembly 14 will cause shaft 16 to reciprocate with respect to pipe sections 20 and 22.

Assembly 14 further includes a pipe-gripping member 112 identical in all respects to member 62. One end of member 112 is secured in any suitable manner to a screw 114 extending through a bore 116 in a third portion 118 integral with portion 98 and forming a part of body 94. A collar 120 is releasably retained within a bore 122 in portion 118 by a setscrew 124, collar 120 being threadably mounted on screw 114 and having a handle 126 for rotating the same with respect to portion 118. Collar 120 is provided with an annular recess 128 which receives setscrew 124 to permit rotation of collar 120 relative to portion 118.

Portion 98 is provided with a projection or foot 130 which engages end face 29 of section 22 when assembly 14 is mounted thereon. Body 94 below portion 98 has a segment 131 provided with an arcuate surface 133 adapted for engaging flange 28 of section 22. The flange-engaging surface 133 of segment 131 readily moves into its operative position when projection 130 engages face 29. Portion 100 is provided with a segment 132 spaced from segment 131 and has an arcuate surface 134 for engaging section 22 adjacent to flange 30. As shown in FIGS. 2 and 4, projection 132 extends outwardly from assembly 14 a greater distance than projection 130. The curvatures of face 44 and the arcuate surfaces 133 and 134 of segments 131 and 132 respectively are preferably configured so that tool 10 can be used with pipe sections of different outside diameters. Specifically, it is contemplated that pipe sections having outer diameters in the range of 2 to 8 inches can be joined by tool 10. Although face 44 and the arcuate surfaces 133 and 134 of segments 131 and 132 are not completely complemental to the outer surfaces of pipe sections having diameters in this range, they are substantially complemental to such surfaces to thereby facilitate the coupling of assemblies 12 and 14 to respective pipe sections.

Portion 98 is provided with a groove 136 for receiving a stretch 138 of member 112. A series of spaced projections 140 are provided on opposed sides of groove 136 to define recesses therebetween for receiving the outer ends of pins 142 of member 112. Thus, stretch 138 is releasably secured to portion 98 and is precluded from movement in either direction through groove 136.

In operation, sections 20 and 22 are initially separated from each other and are adapted to be joined together with tool 10. Before the sections are fitted together, seal 26 is placed within portion 24 and assembly 14 is releasably coupled to section 22. This is accomplished by placing tool 10 on section 22 so that surfaces 133 and 134 engage the outer surface of flange 28 and section 22 respectively, as indicated. Member 112 is looped about section 22 and stretch 138 is placed within groove 136 where it is releasably held by virtue of projections 140. Handle 126 is then rotated to shift screw 114 in a direction away from section 22. This forces section 22 tightly against faces 133 and 134 so as to releasably interconnect assembly 14 and section 22.

Assembly 12 is then coupled to section 20 by looping member 62 about the outer surface of section 20, whereupon stretch 60 is disposed within groove 58 and through the passageway defined by body 36 and extremity 64. Stretch 60 is retained within groove 58 by virtue of projections 66 which releasably hold member 62 against movement in either direction through the aforesaid passageway. Screw 78 is then manipulated by the rotation of collar 80 so that section 20 is forced tightly against faces 44 and 48.

Handle 18 is then rotated in a clockwise sense when viewing FIG. 2 through a small arc until the end of section 20 is adjacent to the outer end of seal 26. If section 20 is angularly disposed with respect to section 22, head 34 may be shifted transversely of shaft 16 until sections 20 and 22 are in proper alignment with each other. Thereupon, handle 18 is further shifted in a counterclockwise sense when viewing FIG. 2 to urge section 20 into section 22. Assembly 12 is thus moved into the dashed-line position of FIG. 2 as handle 18 also moves into the dashed-line position shown in FIG. 2. Section 20 is thus effectively joined with section 22 and tool 10 may be removed from the sections after the fit has been completed.

The lateral shifting movement of head 34 compensates for irregularities in the outer surface of either of the sections 20 and 22 so that tool 10 is substantially self-aligning. Although any variations in the outer surfaces of sections 20 and 22 are believed to be small enough to be compensated for by tool 10 as illustrated, it is conceivable that the length of slot 86 could be increased to accommodate pipe sections having greater variations in the diameters of their outer surfaces.

The configuration of head 34 permtis member 62 to effectively grip the outer surface of section 20 except for a small part thereof adjacent to rib 46. Thus, assembly 12 more efficiently grips section 20 than is capable with gripping assemblies of conventional pipe fitting tools. Moreover, face 48 of rib 46 prevents the canting or angular movement of section 20 during the piping fitting operation. As section 20 is forced into seal 26 there is a tendency for section 20 to be shifted laterally of its longitudinal axis, such tendency being overcome by the presence of rib 46.

To separate tool 10 from sections 20 and 22, handles 84 and 126 are rotated to shift screws 78 and 114 respectively toward sections 20 and 22 respectively. Members 62 and 112 are thus moved out of gripping relationship to sections 20 and 22 and may then be removed from grooves 58 and 136.

Segments 131 and 132 with their respective surfaces 133 and 134 cooperate with faces 44 and 48 to maintain the alignment of sections 20 and 22 during the pipe fitting operation. This is accomplished after head 34 has been adjusted to align the longitudinal axes of sections 20 and 22.

Tool 10 can be used by a single individual and may be utilized with pipe sections of substantially any diameter, it being necessary only that members 62 and 112 be of sufficient length to encircle the sections to be joined. Shaft 16 may be actuated by means other than handle 18. Similarly, screws 78 and 114 may be operated by means other than by handles 84 and 126.

Having thus described the invention, what is claimed as new and desired to be secured by Letters Patent is:

1. A tool for telescopically joining a first section of pipe with a second section of pipe comprising:
   a first assembly for gripping said first section of pipe;
   a shaft reciprocably carried by said first assembly;

a second assembly operatively connected to said shaft for gripping the second section of pipe;

aligning means carried by said assemblies for maintaining said first and second sections of pipe in axial alignment, said aligning means including head means shiftably mounted on said shaft; and means coupled with said shaft for reciprocating the same to thereby effect relative movement between said first assembly and said second assembly so that on reciprocation of said shaft said first section of pipe is telescopically joined with said second section of pipe.

2. A tool as set forth in claim 1, wherein said second assembly is provided with a head having a slot therein extending transversely of said second-section, said shaft being shiftably received within said slot.

3. A tool as set forth in claim 2, wherein said shaft is provided with a pair of opposed, flat surfaces complementally received within said slot, whereby the head is prevented from rotating on said shaft.

4. A tool as set forth in claim 2, wherein is included means releasably retaining said head on said shaft.

5. A tool as set forth in claim 1, the aligning means on said first assembly comprising a pair of spaced apart projections, each having a pipe engaging surface, the aligning means on said second assembly comprising a head carried by said assembly and shiftably mounted on said shaft for movement toward and away from said second section of pipe.

6. A tool as set forth in claim 5, wherein said second assembly includes a head having an arcuate, pipe-engaging face and a pipe-engaging rib adjacent said face to substantially eliminate angular movement of one pipe section relative to the other pipe section when said shaft is moved in a direction to join said sections.

7. A tool as set forth in claim 1, wherein said second assembly is provided with a head having a pair of grooves, a flexible, pipe-engaging gripping member received within said grooves, and means releasably and adjustably retaining the gripping member in said grooves, the latter being convergent as the corresponding pipe section is approached.

8. A tool as set forth in claim 7, wherein said retaining means includes a number of spaced projections extending into one of the grooves from opposed sides thereof to define a recess between each pair of adjacent projections respectively, said gripping member including a chain having a plurality of transverse pins projecting outwardly from opposed sides thereof, certain of said pins being releasably received within the recesses formed by said projections.

9. A tool as set forth in claim 7, wherein said retaining means includes a screw extending into one of said grooves and being rotatable relative to said head.

10. A tool as set forth in claim 7, wherein said retaining means includes a number of spaced projections extending into one of the grooves from opposed sides thereof to define a recess between each pair of adjacent projections respectively, said gripping member including a chain having a plurality of transverse pins projecting outwardly from opposed sides thereof, certain of the pins adjacent one end of said chain being releasably received within the recesses formed by said projections, a screw extending into the other groove, being coupled to the opposite end of said chain and being rotatable relative to the head, and means coupled with said screw for rotating the same in opposed directions.

11. A tool for fitting a first section of pipe into a second section of pipe comprising:

a pipe gripping assembly having a pair of spaced, arcuate, pipe-engaging faces and flexible gripping means for urging one section of pipe into tight engagement with said faces;

a shaft reciprocably mounted on said assembly for movement along a path substantially parallel to the longitudinal axis of said one section;

means pivotally coupled to said assembly and to one end of said shaft for reciprocating the latter relative to said assembly, said shaft having a pair of opposed, flat surfaces at the opposite end thereof, said surfaces being disposed in planes substantially perpendicular to said longitudinal axis;

a head having a slot, said opposite end of the shaft being shiftably received within said slot, the diameter of the shaft being less than the length of said slot and the distance between said flat surfaces of the shaft being substantially equal to the width of the slot to permit said head to shift relative to said shaft toward and away from said axis without rotating about said shaft;

means releasably retaining the head on said opposite end of the shaft;

means defining a pair of grooves on said head, said grooves being convergent as said axis is approached;

a flexible pipe-engaging gripping member having stretches received within said grooves, said head having an arcuate pipe-engaging face, said gripping member being disposed for urging the other pipe section into tight engagement with said face of said head, the extremities of said grooves adjacent to said other pipe section being in relatively close proximity to each other whereby said gripping member engages the major portion of said other pipe section when the latter is in tight engagement with said face of the head;

a rib carried by said head adjacent said face thereof, said rib being disposed for engaging said other pipe section to prevent angular movement of said other pipe section relative to said axis as said other pipe section is advanced toward said one pipe section upon movement of said head toward said assembly; and means releasably and adjustably retaining said flexible member in said grooves.

References Cited by the Examiner

UNITED STATES PATENTS

| | | | |
|---|---|---|---|
| 1,894,835 | 1/1933 | Smith et al. | 29—234 |
| 1,940,910 | 12/1933 | Hickey | 29—272 X |
| 2,691,211 | 10/1954 | Leiber | 29—237 |
| 2,916,812 | 12/1959 | Milo | 29—237 |

WILLIAM FELDMAN, *Primary Examiner.*

J. C. PETERS, *Assistant Examiner.*